United States Patent
Kawahara (10) Patent No.: US 7,231,556 B2
(45) Date of Patent: Jun. 12, 2007

(54) DATA PROCESSING APPARATUS HAVING ERROR CONCEALMENT FUNCTION

(75) Inventor: Minoru Kawahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 10/625,144

(22) Filed: Jul. 23, 2003

(65) Prior Publication Data
US 2004/0148551 A1   Jul. 29, 2004

(30) Foreign Application Priority Data
Jul. 25, 2002   (JP) ............. P2002-217068

(51) Int. Cl.
*G06F 11/00* (2006.01)
(52) U.S. Cl. .................. 714/54; 714/747
(58) Field of Classification Search .......... 714/54, 714/747
See application file for complete search history.

(56) References Cited

U.S. PATENT DOCUMENTS

| | | | |
|---|---|---|---|
| 4,497,055 A * | 1/1985 | Hoshino et al. ........... 714/747 |
| 4,519,001 A * | 5/1985 | Morrison ..................... 386/2 |
| 4,680,763 A * | 7/1987 | Suma et al. ................ 714/758 |
| 5,193,010 A * | 3/1993 | Juri et al. .................... 386/47 |
| 5,313,471 A * | 5/1994 | Otaka et al. ............... 714/747 |
| 5,809,041 A * | 9/1998 | Shikakura et al. ......... 714/747 |
| 6,304,990 B1* | 10/2001 | Shikakura et al. ......... 714/747 |

FOREIGN PATENT DOCUMENTS

| | | |
|---|---|---|
| JP | 10-210410 | 8/1998 |
| JP | 11 136631 | 5/1999 |
| JP | 2001-103479 | 4/2001 |
| WO | WO 96 08014 | 3/1996 |
| WO | WO 01 60062 | 8/2001 |

* cited by examiner

Primary Examiner—Dieu-Minh Le
(74) Attorney, Agent, or Firm—Frommer Lawrence & Haug LLP; William S. Frommer; Thomas F. Presson (57) ABSTRACT

Main line data as video data and low-resolution data obtained by lowering the resolution of the video data and the data amount thereof is recorded on an optical disk. The main line data and the low-resolution data are read from the optical disk. While the main line data and the low-resolution data are decoded, the main line data is detected for an error. If the main line data is found not having an error, then the decode result of the main line data is outputted. If the main line data is found having an error, then the decode result of the low-resolution data is outputted.

9 Claims, 9 Drawing Sheets

DATA PROCESSING APPARATUS HAVING ERROR CONCEALMENT FUNCTION

BACKGROUND OF THE INVENTION

The present invention relates generally to a data processing apparatus for facilitating data error concealment.

Recently, recording media significantly enhanced in recording rate, such as optical disks and so on, are in practical use, realizing the long-time recording of video data with comparatively high picture quality.

However, as compared with audio data and text data, video data are huge in data volume, so that the processing of video data requires significantly much heavier load than that in the processing of audio data and text data, despite of the rapid enhancement in the recording rate of recording media.

In order to reduce the recording rate while restricting picture quality deterioration, a method is known in which video data is compressed by means of MPEG (Moving Picture Experts Group) encoding for example.

However, if video data is compressed by the MPEG encoding for example, the decoding of compressed video data sometimes takes much time.

To be more specific, in MPEG, a long GOP is sometimes employed as a GOP (Group Of Pictures). With a long GOP, the reproduction of a frame (or a field) sometimes requires to reproduce another long-GOP frame.

Because MPEG is required to decode another frame in order to decode a certain frame as described above, it is difficult to cope with errors, if any, in the data read from an optical disk, namely it is difficult to execute error concealment.

To be more specific, if a long GOP is employed, one GOP is formed by 15 frames, in order to decode a P-picture and a B picture in the frames forming this one GOP, an I-picture or a P-picture that is another frame must sometimes be required. Therefore, if an error occurs in an I-picture frame forming a long GOP, failing the decoding thereof, all frames forming this long GOP, namely 15 frames, may not be decoded. As a result, let the frame period be 1/30 second, then the video data cannot be outputted for as long as 0.5 (=15×1/30) second.

Further, with a long GOP, the decoding of the B picture of a GOP may require the P-picture of a GOP one step before that GOP. Therefore, if the I-picture forming a GOP cannot be decoded due to an error, all frames of that GOP and some of the frames of the next GOP may not be decoded.

For this reason, when video data is encoded by MPEG and recorded to an optical disk, counter error measures such as enhancing error correction capabilities may be taken; however, it is still difficult for this approach to perform high redundant, complete error correction.

For the encoding within a frame other than a long GOP frame, error correction may be sometimes impossible.

To solve this problem, a method is proposed in which same video data is recorded in separate recording areas of an optical disk before hand and, if an error occurs on the video data recorded in one recording area, the failing error portion is replaced with the video data recorded in another recording area.

However, if an error occurs on the video data recorded in a particular recording area and the video data recorded in another recording area are read in replacement, a seek time, a rotational delay time, and a time for reading the video data are required, thereby making it difficult to reproduce the video data real-time.

Also, a method is proposed in which, if, in recording video data on an optical disk, an error occurs at a position on the optical disk due to the recording of pixels or blocks in a spatial or temporal proximity with each other to discontinuous positions on the optical disk, the video data in a frame is protected from total destruction by the error and the failing video data portion is interpolated with the error-free corresponding video data.

However, in this method, if an error occurs, a circuit dedicated to video data interpolation, namely a circuit dedicated to error concealment, is required, thereby enlarging equipment scale. In addition, this method involves the degradation in compression efficiency because pixels and blocks in a spatial or temporal proximity with each other are recorded to discontinuous positions on an optical disk.

SUMMARY OF THE INVENTION

It is therefore an object of the present invention to facilitate data error concealment.

To achieve the above object, according to one aspect of the present invention, there is provided a data processing apparatus including: error detection means for detecting first data for an error, the first data being read from a data recording medium storing the first data and second data corresponding to the first data and having a data amount smaller than that of the first data; and error concealment means for concealing an error if any found on the first data by use of the second data read from the data recording medium.

In carrying out the invention and according to another aspect thereof, there is provided a data processing method including the steps of: detecting first data for an error, the first data being read from a data recording medium storing the first data and second data corresponding to the first data and having a data amount smaller than that of the first data; and concealing an error if any found on the first data by use of the second data read from the data recording medium.

In carrying out the invention and according to still another aspect thereof, there is provided a program for making a computer execute a data processing method, the program including the steps of: detecting first data for an error, the first data being read from a data recording medium storing the first data and second data corresponding to the first data and having a data amount smaller than that of the first data; and concealing an error if any found on the first data by use of the second data read from the data recording medium.

In the data processing apparatus, method, and program according to the invention, error detecting is performed on first data read from a data recoding medium on which the first data and second data which corresponds to the first data but are lower in resolution than the first data. If an error is detected on the first data, error concealment for the first data is executed by use of the second data read from the data recording medium.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
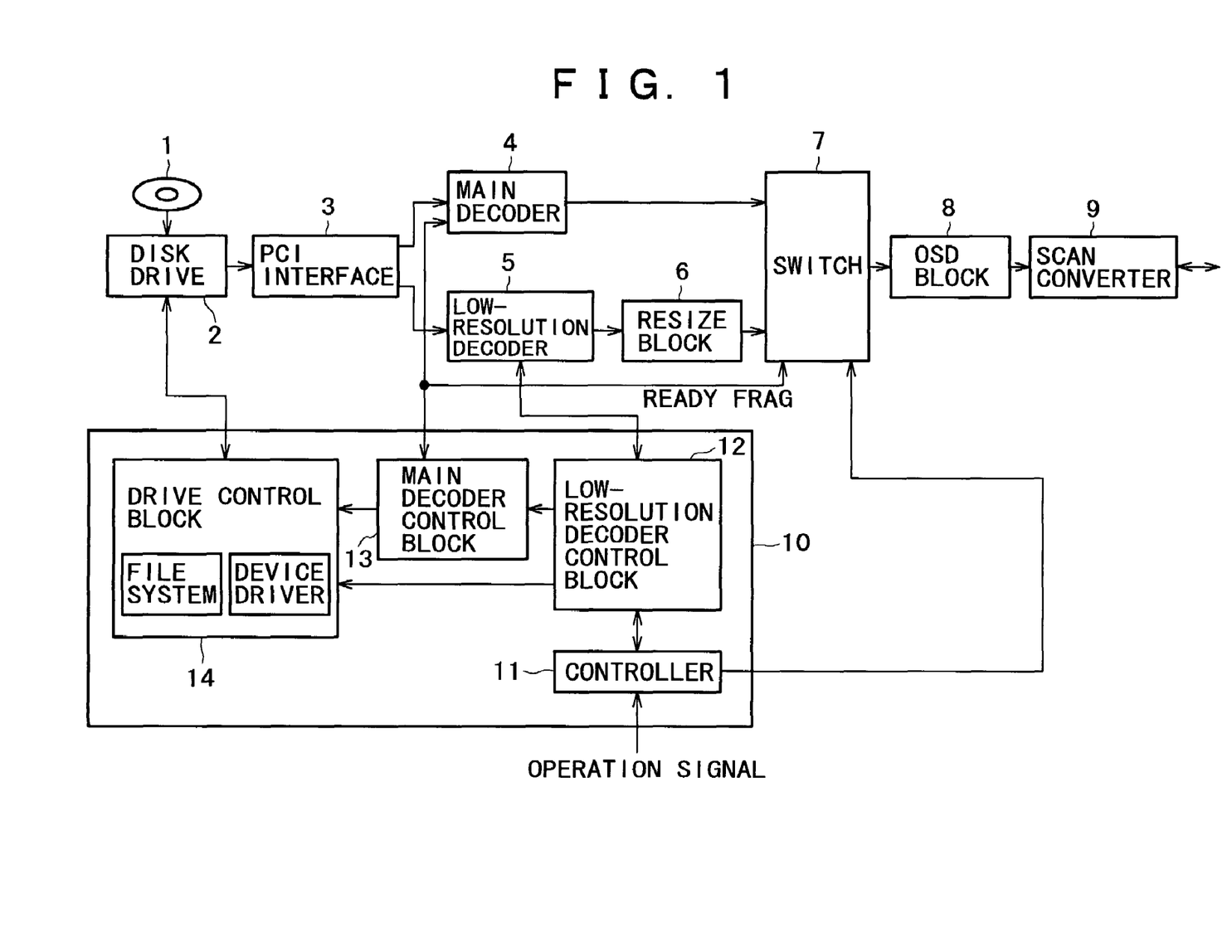
FIG. 1 is a block diagram illustrating an exemplary configuration of a disk reproducing apparatus practiced as one embodiment of the invention.

Now referring to FIG. 1, there is shown an exemplary configuration of a disk reproducing apparatus practiced as one embodiment of the invention.

On an optical disk 1, encoded data obtained by MPEG-encoding, for example, video data of high resolution or standard resolution is recorded. In addition, encoded data obtained by encoding, based on a predetermined method, video data smaller in amount than the video data having high or standard resolution, namely, for example, video data having low resolution, which is the video data obtained by lowering the resolution of the encoded data, is recorded on the optical disk 1.

The video data having high or standard resolution is originally intended for the provision to the user. The encoded data obtained by encoding the video data is hereafter appropriately referred to as main line data. The video data of low resolution obtained by lowering the resolution of the video data of high or standard resolution is hereafter appropriately referred to as low-resolution data.

A disk drive 2 is adapted to detachably load the optical disk 1. Under the control of a drive control block 14 of a system controller 10, the disk drive 2 reads the main line data and low-resolution data from the optical disk 1 loaded on the drive 2 and supplies these data to a PCI (Peripheral Component Interconnect) interface 3.

The PCI interface 3, functioning as the interface between the disk drive 2 and a main decoder 4 or a low-resolution decoder 5, supplies main line data supplied from the disk drive 2 to the main decoder 4 and the low-resolution data supplied from the disk drive 2 to the low-resolution decoder 5.

Under the control of a main decoder control block 13, the main decoder 4 MPEG-decodes, for example, the main line data supplied from the PCI interface 3 and supplies the resultant high or standard resolution video data (hereafter appropriately referred to as main line video data) to a switch 7. Also, the main decoder 4 supplies a ready flag indicative of the output ready state of the video data obtained by decoding the main line data supplied from the PCI interface 3 to the switch 7 and the main decoder control block 13.

The ready flag is a 1-bit flag and "1" if the output of video data to the main decoder 4 is ready and "0" if the output is not ready, for example.

Further, the main decoder 4 detects whether or not there is an error on the main line data supplied from the PCI interface 3. If the main line data is found to be error-free (that is, the main line data is ready for decoding), then the main decoder 4 keeps the value of the ready flag unchanged; if the main line data have an error (that is, the main line data is not ready for decoding), the main decoder 4 changes the value of the ready flag from "1" to "0". Therefore, if the main line data have an error, in addition to a case that the output of video data by the main decoder 4 is not ready, the ready flag is set to "0".

Under the control of a low-resolution decoder control block 12 of the system controller 10, the low-resolution decoder 5 decodes the low-resolution data supplied from the PCI interface 3 and supplies the resultant video of low resolution (hereafter referred to as low-resolution video data) to a resize block 6.

The resize block 6, formed by a polyphase filter of 5:2 long (PAL 3:1) and 11:4 wide, thins out the horizontal lines of the low-resolution data which is the progressive video data formed by 30 horizontal lines per frame, thereby generating the video data based on interleave formed by 60 horizontal lines per field. In addition, the resize block 6 interpolates, for example, the pixels of the video data to generate the video data (hereafter appropriately referred to as resized video data) whose size (the number of pixels) is equal to that of the main line video data outputted from the main decoder 4, supplying the resized video data to the switch 7. It should be noted that if the low-resolution video data recorded on the optical disk 1 is the same in size as the main line video data, this resize block 6 is not required.

In response to the ready flag supplied from the main decoder 4, the switch 7 selects either the main line video data outputted from the main decoder 4 or the resized video data outputted from the resize block 6 and supplies the selected video data to an OSD (On Screen Display) block 8. In addition, under the control of a controller 11, selects either the main line video data outputted from the main decoder 4 or the resized video data outputted from the resize block 6 and supplies the selected video data to the OSD block 8. Therefore, in the embodiment shown in FIG. 1, the selective output by the switch 7 of main line video data or resized video data may be determined by not only the ready flag but also the control by the controller 11.

The OSD block 8 superimposes, as required, information such as a time code on the video data supplied from the switch 7 and supplies the superimposed video data to a scan converter 9. The scan converter 9 converts, as required, the scanning of the video data supplied from the OSD block 8 and supplies the conversion information to a display device, not shown, and display it.

The system controller 10, configured by the controller 11, the low-resolution decoder control block 12, and the drive control block 14, controls the component blocks of the disk reproducing apparatus.

To be more specific, the controller 11 receives an operation signal that is supplied when the user operates an operator block, not shown, and, in accordance with the received operation signal, controls the switch 7 and the low-resolution decoder control block 12.

Under the control of the controller 11, the low-resolution decoder control block 12 controls the low-resolution decoder 5 and the drive control block 14. To be more specific, when the reproduction of low-resolution data is commanded by the controller 11, the low-resolution decoder control block 12 directly controls only the drive control block 14 and, when the reproduction of main line data is commanded, controls both the low-resolution decoder control block 12 and the drive control block 14.

The main decoder control block 13 monitors the control of the low-resolution decoder 5 by the low-resolution decoder control block 12 and controls the main decoder 4 and drive control block 14 so that they follow the control performed by the low-resolution decoder control block 12.

The drive control block 14, configured by a file system and a device driver for example, controls the disk drive 2 under the control of the low-resolution decoder control block 12 and the main decoder control block 13.

It should be noted that, in the embodiment shown in FIG. 1, the system controller 10 may be configured by software and each of the blocks other than the system controller 10 may be configured by dedicated hardware, for example. Also, the main decoder 4, the low-resolution decoder 5, the resize block 6, and the switch 7 may be implemented by having a DSP (Digital Signal Processor) execute programs. Alternatively, the system controller 10 may be configured by dedicated hardware as well as software.

It should also be noted that, in the disk reproducing apparatus shown in FIG. 1, the optical disk 1 is reproduced; it will be apparent that other recording media such as a magnetic disk, a magneto-optical disk, a magnetic tape, or a semiconductor memory may also be reproduced.

Figure 2:
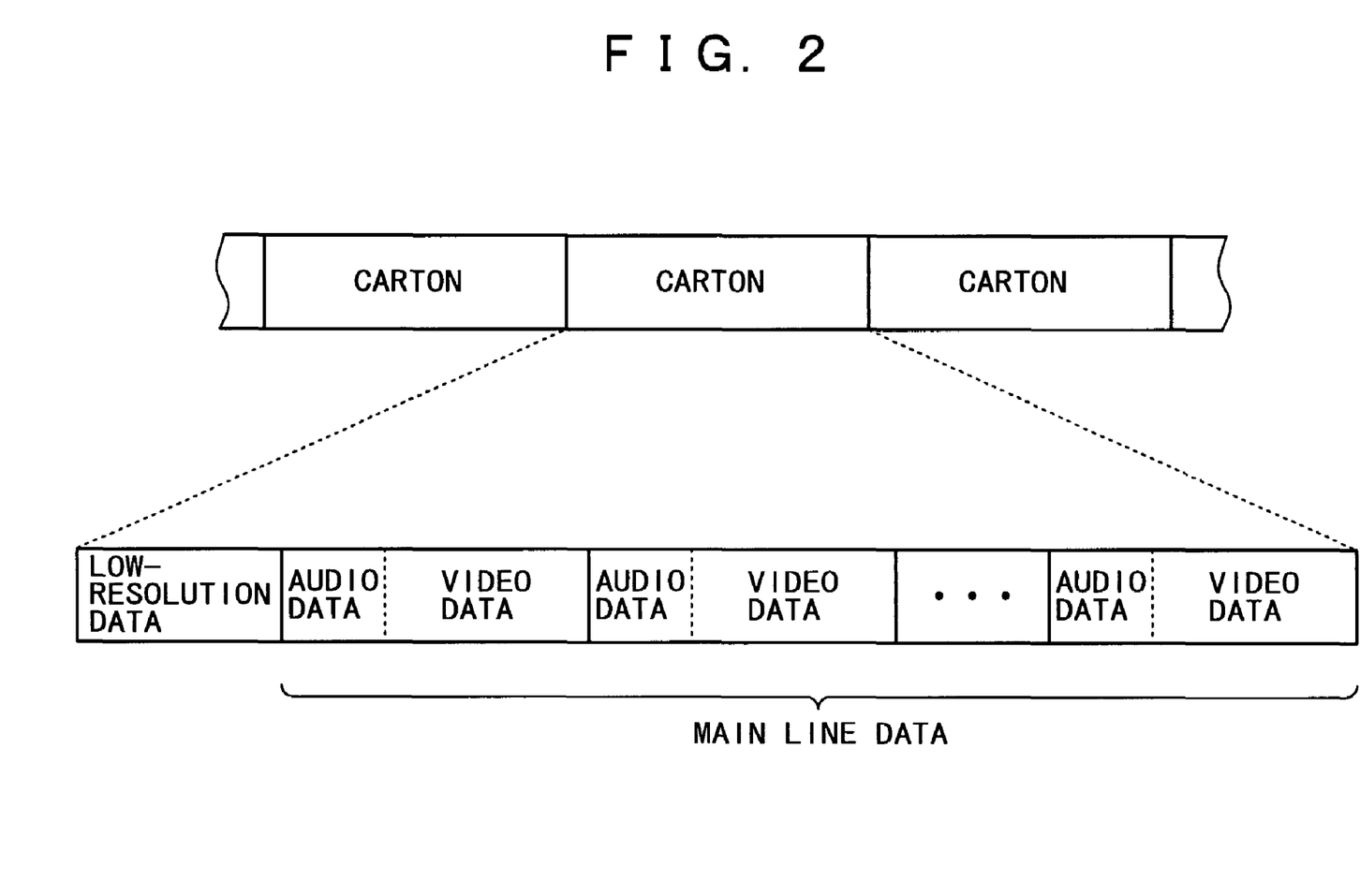
FIG. 2 is a diagram illustrating an exemplary recording format of an optical disk.

FIG. 2 shows an exemplary recording format of the optical disk 1.

With the optical disk 1, based on CLV (Constant Linear Velocity) for example, each track is divided into a plurality of sectors. Further, each cluster is formed by one or more sectors. Data is read from or written to the optical disk 1 in units of cluster. Here, each cluster may be configured by a recording area of 64 KB (kilobytes) for example.

As described above, main line data and the low-resolution data corresponding thereto are recorded on the optical disk 1. These main line data and low-resolution data are recorded in units of a predetermined time such as 1.5 through 2 seconds for example or in units of predetermined amount of the original video data (the video data before encoding).

To be more specific, let the main line data and the low-resolution data of a predetermined time or a predetermined amount of the original video data be a carton, then, as shown in FIG. 2, the main line data and the low-resolution data are recorded on the optical disk 1 in units of carton. It should be noted that, if the data recording, so-called shuttle reproduction, and data concealment on the optical disk 1 based on CLV and the eject time of the optical disk 1 is taken into account, it is reasonable for one carton to be 1.5 through 2 seconds of the original video data.

As shown in FIG. 2, each carton is formed by low-resolution data and main line data corresponding thereto in this order. Therefore, the low-resolution video data obtained by decoding low-resolution data arranged in a particular carton and the main line video data obtained by decoding the main line data is the same in content but different in resolution.

It should be noted that main line data may include video data and the audio data that accompany the video data. If the video data and the audio data is included in the main line data, the video data for a predetermined data amount or predetermined reproduction duration and the accompanying audio data is arranged in a set as shown in FIG. 2.

For the video data included in the main line data, video data having 25 Mbps (Mega bits per second) data rate in which one GOP (Group of Pictures) is formed by 15 frames may be employed, for example. For the audio data included in the main line data, audio data having 3 Mbps data rate of 4 channels 16-bit quantized at 48 KHz sampling rate may be employed, for example. For the low resolution data, the low resolution data obtained by encoding video data having 256 (wide)×192 (long) pixels on the basis of JPEG (Joint Photographic Coding Experts Group) may be employed.

If the low-resolution data is the data obtained by JPEG-encoding video data as described above, the low-resolution decoder 5 shown in FIG. 1 is configured by a JPEG decoder.

Each carton can also include the time code of the video data obtained by decoding the low-resolution data and the main line data, and meta data. The meta data may include any user information and the information such as the main line data recording start position in the carton and the structure of the GOP of the video data included in the main line data.

Assume here that the total data rate of the meta data such as the above-mentioned time code and the low-resolution data be 2 Mbps for example, the data rate of the data to be recorded on the optical disk 1 on a carton basis is 30 (=25+3+2) Mbps. Therefore, for the optical disk 1, an optical disk having a recording rate of 35 Mbps, which is sufficiently within a practical range, may be employed.

It should be noted that the low-resolution data is arranged at a position different from that of the main line data and have a sufficiently lower data rate and smaller data amount that those of the main line data. Therefore, the low-resolution data may be verified at the time of recording to the optical disk 1 and written with a higher reliability than that of the main line data.

Also, for the low-resolution data, the data obtained by encoding video data by a fixed method such as JPEG may be employed, thereby facilitating the checking of the contents of the optical disk 1 if the data obtained by encoding the video data by any encoding method. Namely, in this case, any apparatus that is at least possible to perform MPEG decoding can decode the low-resolution data if not the main line data, thereby checking the recorded contents of the optical disk 1.

As described above, the optical disk 1 is recorded with the main line data and the low-resolution data of smaller data amount corresponding to the video data of the main line data, so that the low-resolution data may be read from the optical disk 1 along with the main line data. Therefore, if an error occurs on the main line data for example, error concealment may be performed by use of the low-resolution data, thereby preventing real-time reproduction from being interrupted. Also, when reading only the main line data from the optical disk 1, if the reading of the main line data fails for example, getting in a state where it is too late for real-time reproduction, immediately reading and reproducing the low-resolution data of a smaller data amount may prevent real-time reproduction from being interrupted.

It should be noted that the main line data may include audio data in addition to video data as described above; in the present embodiment, however, the processing of audio data is skipped for the brevity of description.

The following describes the processing of the data reproduction apparatus shown in FIG. 1 with reference to the flowcharts shown in FIGS. 3 through 6.

Figure 3:
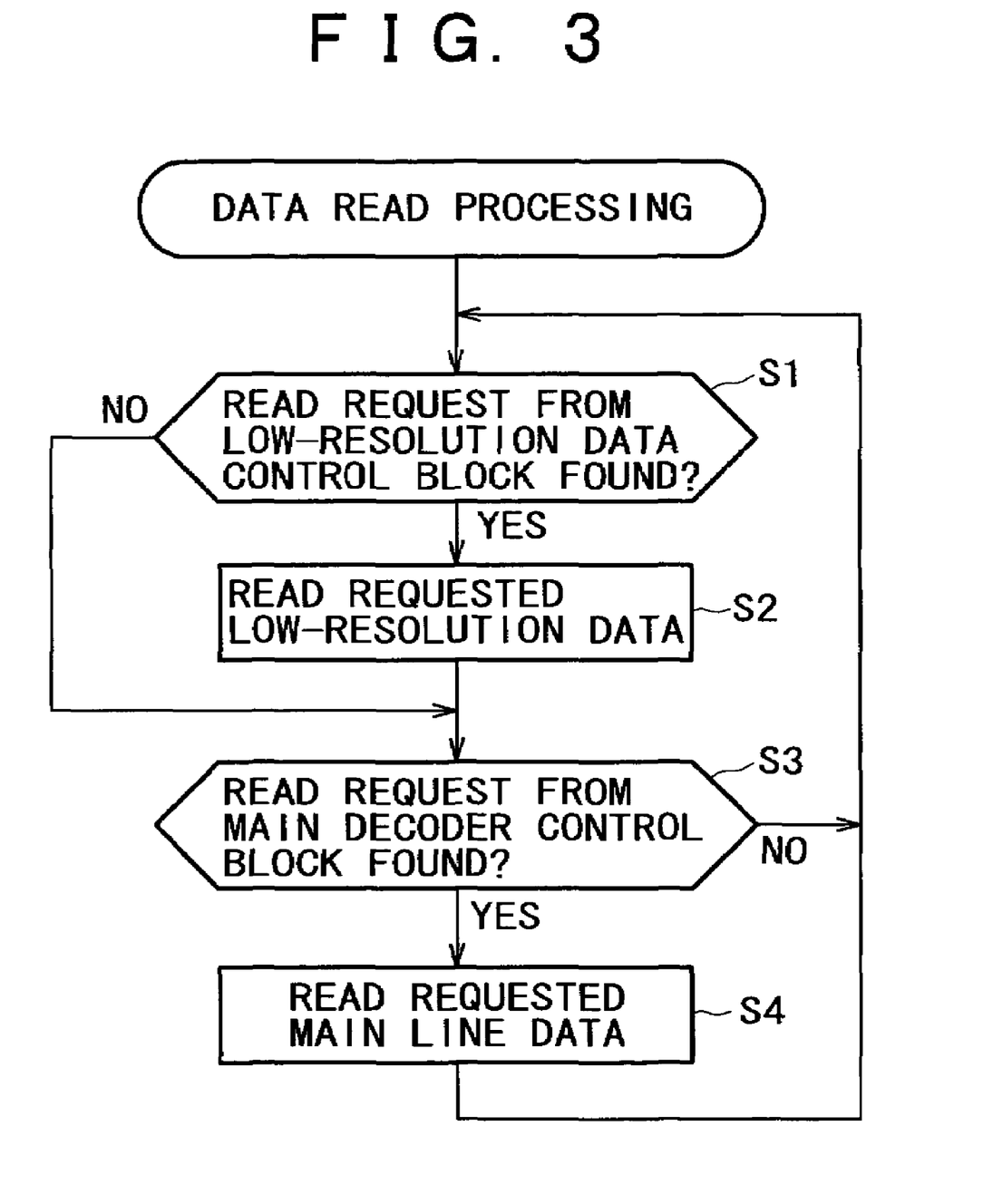
FIG. 3 is a flowchart describing data read processing.

First, with reference to the flowchart shown in FIG. 3, the data read processing for reading data from the optical disk 1 will be described.

In the data read processing, in step S1, the drive control block 14 determines whether or not a low-resolution data read request has been made by the low-resolution decoder control block 12.

If a low-resolution data read request is found in step S1, then the drive control block 14 controls the disk drive 2 in step S2 to read the requested low-resolution data from the optical disk 1, upon which the procedure goes to step S3. Consequently, the disk drive 2 reads the low-resolution data from the optical disk 1 on a carton basis and supplies the low-resolution data to the low-resolution decoder 5 via the PCI interface 3.

If a low-resolution data read request is not found in step S1, then the procedure goes to step S3, skipping step S2, in which the drive control block 14 determines whether or not a main line data read request has been made by the main decoder control block 13.

If a main line data read request is not found in step S3, then the procedure returns to step S1, skipping step S4, to repeat the above-mentioned processing.

If a main line data read request is found in step S3, then the procedure goes to step S4, in which the drive control block 14 controls the disk drive 2 to read the requested main line data from the optical disk 1. Consequently, the disk drive 2 reads the main line data from the optical disk 1 on a carton basis and supplies the main line data to the main decoder 4 via the PCI interface 3.

After step S4, the procedure returns to step S1 to repeat the above-mentioned processing.

Figure 4:
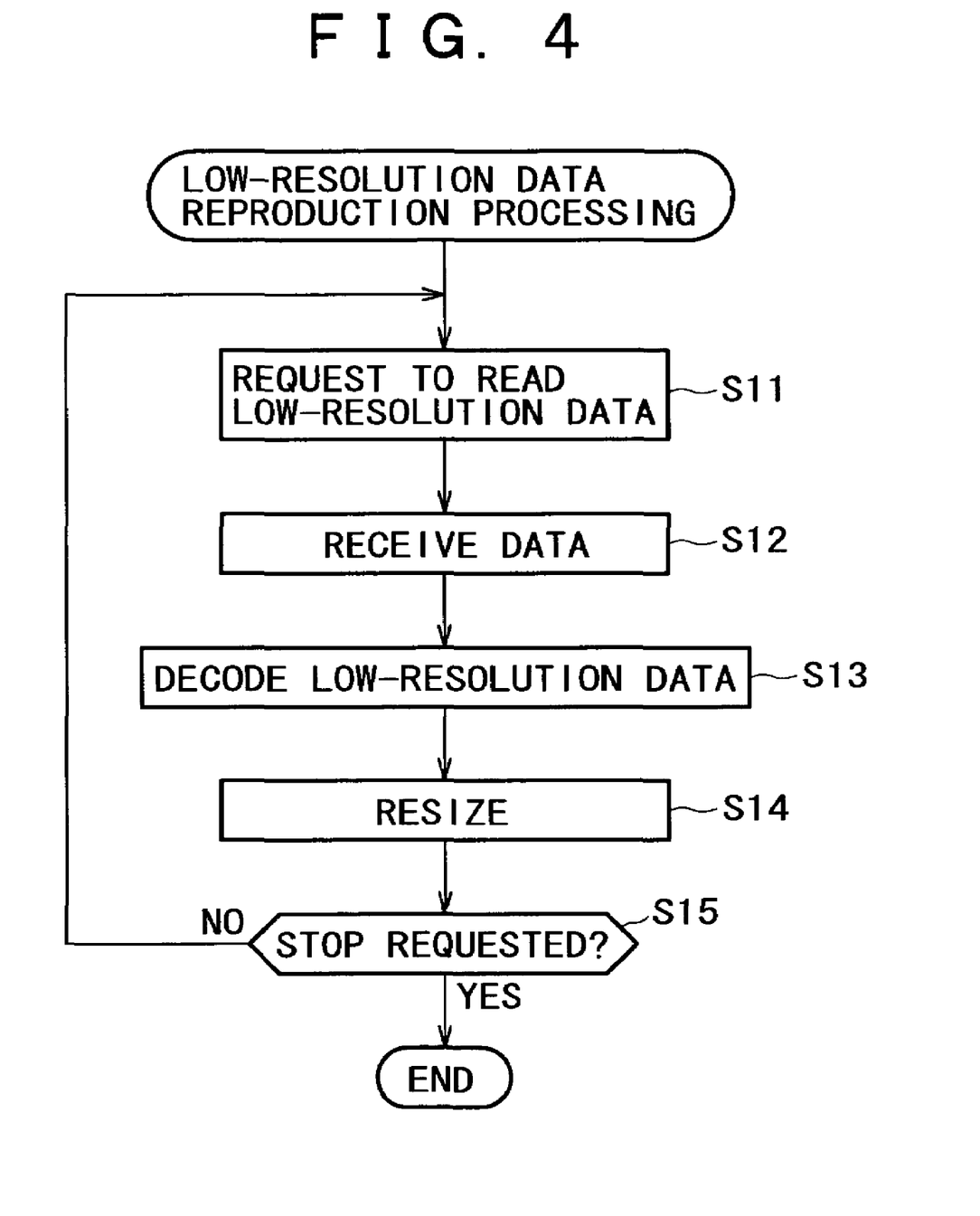
FIG. 4 is a flowchart describing low-resolution data reproduction processing.

The following describes the low-resolution data reproduction processing for reproducing low-resolution data recorded to the optical disk 1, with reference to the flowchart shown in FIG. 4.

The low-resolution data reproduction processing when the user operates the operator block to issue an operation signal commanding the reproduction of an optical disk to the controller 11, for example.

In response to the operation signal issued by the user, the controller 11 supplies a command for reproducing video data to the low-resolution decoder control block 12 along with the information about the position at which the reproduction is to be started. The reproduction start position is specified with a time code for example.

Receiving the video data reproducing command and the reproduction start position information from the controller 11, the low-resolution decoder control block 12 transmits a low-resolution data read request for requesting the low resolution data starting from the reproduction start position to the drive control block 14 in step S11, upon which the procedure goes to step S12.

In step S12, the low-resolution decoder 5 receives the low-resolution data, upon which the procedure goes to step S13. To be more specific, in step S1, in response to the low-resolution data read request from the low-resolution decoder control block 12 to the drive control block 14, the low-resolution data is read from the optical disk 1 and supplied to the low-resolution decoder 5 via the PCI interface 3 as described with reference to FIG. 3. In step S12, the low-resolution decoder 5 receives the supplied low-resolution data, upon which the procedure goes to step S13.

In step S13, the low-resolution decoder 5 decodes the low-resolution data received in step S12 and supplies the resultant decoded low-resolution video data to the resize block 6, upon which the procedure goes to step S14. In step S14, the resize block 6 resizes the low-resolution video data supplied from the low-resolution decoder 5 into the same size as that of main video data and supplies the resultant resized video data to the switch 7, upon which the procedure goes to step S15.

In step S15, the controller 11 determines whether or not an operation signal (hereafter appropriately referred to as a stop signal) for commanding the stop of optical disk reproduction has been supplied to the controller 11 from the operator block by the user. If the stop signal is found not supplied in step S15, then the procedure returns to step S11, in which the low-resolution decoder control block 12 issues, to the drive control block 14, a low-resolution data read request for requesting the low-resolution data of a carton next to the carton requested in step S11, thereby repeating the above-mentioned processing.

If the stop signal is found supplied in step S15, the low-resolution data reproduction processing comes to an end.

As described above, the low-resolution decoder 5 decodes the low-resolution data recorded to the optical disk 1 from the time at which the reproduction of video data is commanded by the user to the time at which the stop of the reproduction is commanded, outputting the resultant low-resolution video data to the resize block 6. Then, the resize block 6 resizes the supplied low-resolution video data and outputs the resultant resized video data to the switch 7.

It should be noted that low-resolution data is low in data rate, so that verification can be performed at the time of recording to the optical disk 1, thereby allowing low resolution data to be recorded to the optical disk 1 while being verified. Consequently, as compared with the main line data which is high in data rate and it is difficult to verify at the time of recording to the optical disk 1, the low resolution data seldom involve an error at the time of reading from the optical disk 1; even if an error occurs, the low-resolution data may be read again from the optical disk 1 without impairing the real-time reproduction owing to the low data rate.

Figure 5:
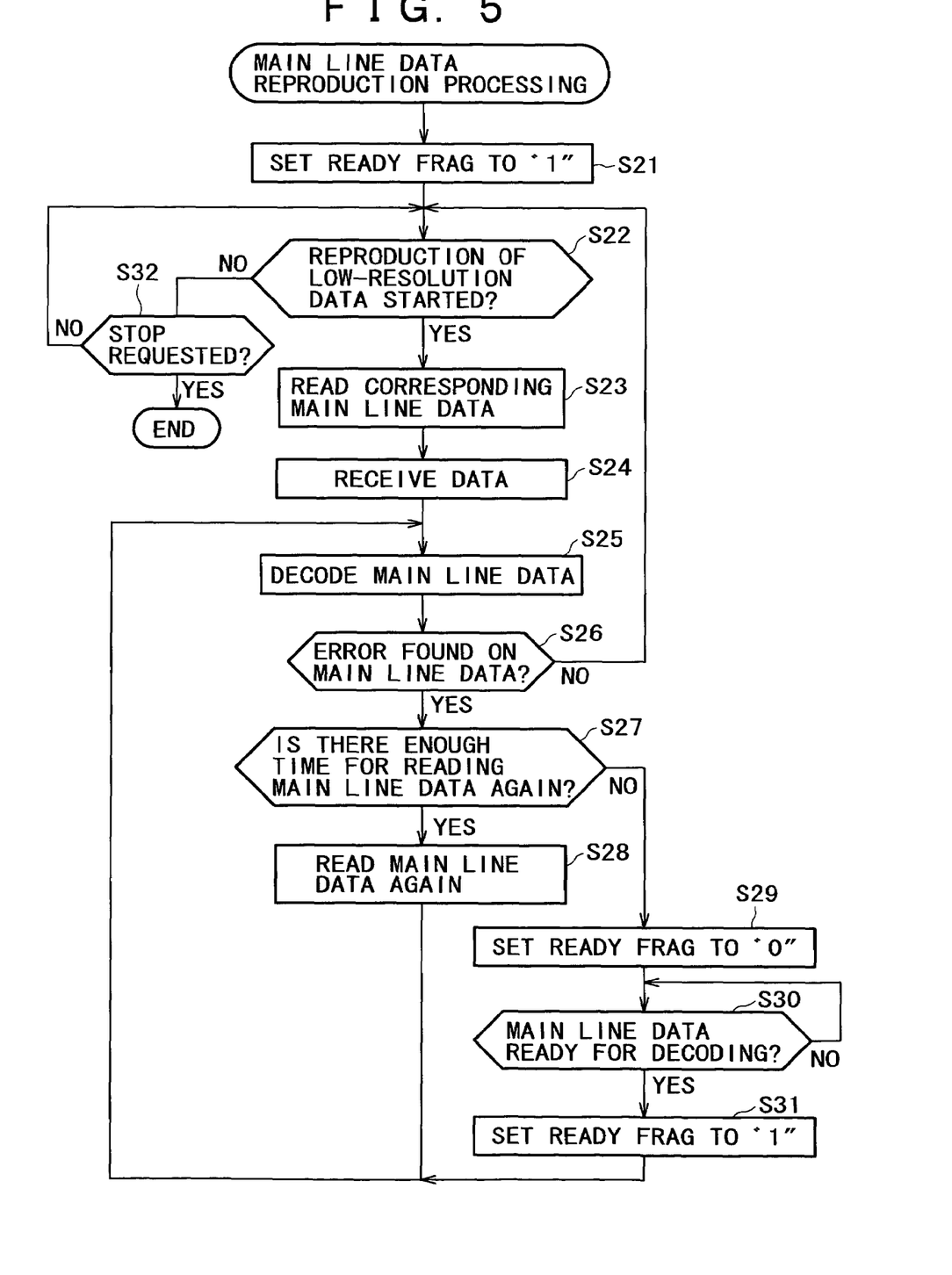
FIG. 5 is a flowchart describing main line data reproduction processing.

The following describes the main line data reproduction processing with reference to the flowchart shown in FIG. 5.

The main line data reproduction processing starts when the low-resolution data reproduction processing shown in FIG. 4 starts, for example.

To be more specific, the main decoder control block 13 monitors the reproduction control of the low-resolution decoder by the low-resolution decoder control block 12 and controls the reproduction of the main line data by following the reproduction of this low-resolution decoder.

Thus, the main decoder control block 13 controls the reproduction of the main line data by following the reproduction of the low-resolution data controlled by the low-resolution decoder control block 12, so that the controller 11 may only control the low-resolution decoder control block 12 without controlling the main decoder control block 13, thereby facilitating the control by the controller 11.

In the main line data reproduction processing, in step S21, the main decoder 4 sets the ready flag to "1" indicative that the output of data is ready and transmits this setting information to the switch 7, upon which the procedure goes to step S22.

In step S22, the main decoder control block 13 monitors the low-resolution decoder control block 12 to determine whether or not the control of the low-resolution data reproduction of a carton has started.

If a control of low-resolution data reproduction is found started in step S22, then the procedure goes to step S23, in which the main decoder control block 13 transmits a main line data read request for requesting the main line data of the same carton to the drive control block 14, upon which the procedure goes to step S24.

In step S24, the main decoder 4 receives the main line data, upon which the procedure goes to step S25. To be more specific, in step S23, in response to the main line data read request transmitted from the main decoder control block 13 to the drive control block 14, the main line data is read from the optical disk 1 and supplied to the main decoder 4 via the PCI interface 3 as described with reference to FIG. 3. In step S24, the main decoder 4 receives the main line data supplied as described above, upon which the procedure goes to step S25.

In step S25, the main decoder 4 decodes the main line data received in step S24, upon which the procedure goes to step S26. In step S26, main decoder 4 determines whether or not there is an error on the main line data decoded (or attempted to decode) in step S25. If the main line data is found having no error, the main decoder 4 transmits the main line video data obtained by decoding the main line data in step S25 to the switch 7, upon which the procedure returns to step S22.

In step S22, the main decoder control block 13 monitors the low-resolution decoder control block 12 to determine whether or not the control of low-resolution data reproduction of a next carton has started, thereby repeating the above-mentioned processing.

As described above, the main decoder control block 13 controls the reproduction of main data by following the reproduction of the low-resolution decoder controlled by the low-resolution decoder control block 12, thereby providing the main line video data outputted from the main decoder 4 and the low-resolution video data outputted from the low-resolution decoder 5 which is different from each other only in resolution, their contents being the same.

It should be noted that the main decoder control block 13, by monitoring the low-resolution decoder control block 12, recognizes a frame decoded in the low-resolution decoder 5 and outputted therefrom, thereby controlling the main decoder 4 such that the main line video data having the same frame as this frame is outputted from the main decoder 4 in synchronization with the output timing of the low-resolution decoder 5.

On the other hand, if an error is found on the main line data in step S26, namely, if an uncorrectable error is found on the main line data due to the failure of reading the main line data or the failure of normally recording of a part of the main line data, then the procedure goes to step S27, in which the main decoder control block 13 determines whether or not there is enough time to read again from the optical disk 1, the same main line data as those requested in the preceding step S23.

If enough time is found to read the main line data from the optical disk 1 in step S27, namely, if there is enough time to real-time reproduce the main line data after considering the seek time and rotational delay on the disk drive 2 and the main line data read and decode times, then the procedure goes to step S28, in which the main decoder control block 13 performs control for reading again the portion of the main line data on which an error is encountered.

To be more specific, in step S28, the main decoder control block 13 transmits a main line data read request for requesting the portion of the main line data on which an error is encountered to the drive control block 14 and the main decoder 4, in response to this main line data read request, receives the requested main line data from the optical disk 1 via the PCI interface 3. Then, the procedure returns to step S25 to repeat the above-mentioned processing.

If there is not enough time to read the main line data again from the optical disk 1 in step S27, namely, if it is too late for the real-time reproduction of the main line data if the portion of the main line data on which an error is encountered is read from the optical disk 1 and decoded after considering the seek time and rotational delay on the disk drive 2 and the read and decode times of the main line data, then the procedure goes to step S29, in which the main decoder 4 sets the ready flag to "0" indicative of the occurrence of uncorrectable error and transmits this setting information to the switch 7, upon which the procedure goes to step S30.

In step S30, the main decoder 4 determines whether or not the main line data received in step S24 is ready for decoding. If the main line data is found not ready for decoding, the procedure returns to step S30.

To be more specific, if an error occurs at least on a part of the main line data and there is not enough time for reading the failing main line data again, the main decoder 4 continues outputting the video data decoded last until the first frame in which the main line data is ready for decoding and, when the main line data is ready for decoding, starts decoding the main line data. Hence, in step S30, a wait time is taken until the main line data is ready for decoding.

Then, if the main line data is found ready for decoding in step S30, namely if the reproduction time (display time) of the last frame which cannot be decoded due to the error occurring on the main line data has passed, the procedure goes to step S31, in which the main decoder 4 sets the ready flag to "1" indicative of the completion of data output preparation and supplies the information thereof to the switch 7. Then the procedure returns to step S25 to repeat the above-mentioned processing.

On the other hand, if the control of low-resolution data reproduction is found not started in step S22, then the procedure goes to step S32, in which the main decoder control block 13 determines whether or not the low-resolution decoder control block 12 has stopped the low-resolution data reproduction control after the user has operated the operator block to supply a stop signal to the controller 11.

If the low-resolution data reproduction control is found not stopped by the low-resolution decoder control block 12 in step S32, then the procedure returns to step S22 to repeat the above-mentioned processing.

If the low-resolution data reproduction control is found stopped by the low-resolution decoder control block 12 in step S32, then the main line data reproduction processing comes to an end.

It should be noted that the procedure may go to step S29 when step S26 is YES, by skipping steps S27 and S28.

As described above, from the command for reproducing the low-resolution data by the user to the command for stopping the reproduction, the main decoder 4 decodes the main line data recorded on the optical disk 1 by following the reproduction of the low-resolution data and outputs the resultant main line video data to the switch 7.

Further, as described above, the resized video data is also supplied to the switch 7 from the resize block 6.

The switch 7, as described above, is controlled by the controller 11 by following an operation signal supplied by the user from the operator block for example, to output one of the main line video data outputted from the main decoder 4 and the resized video data outputted from the resize block 6. Therefore, the user can view both the main line data of high resolution or standard resolution and the resized video data of low resolution.

It should be noted that the switch 7 may be adapted to supply the main line video data of high resolution or standard resolution outputted from the main decoder 4 to a display device of high resolution or standard resolution for monitoring and the low-resolution data outputted from the low-resolution decoder to an editing unit or other image processing units, for example. In this case, the monitoring may be executed by use of the main line video data of high resolution or standard resolution and the actual processing on the image processing unit may be executed by use of the low-resolution video data. As a result, the processing load of the image processing unit may be mitigated, while viewing the main line video data of high resolution or standard resolution as monitoring.

Figure 6:
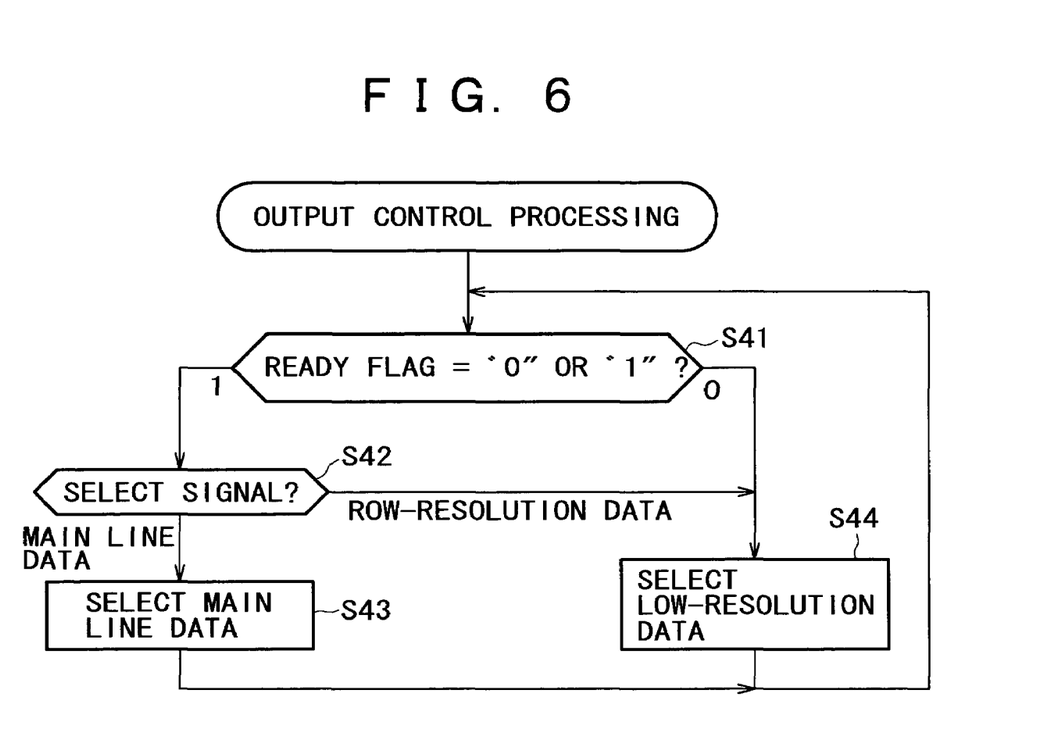
FIG. 6 is a flowchart describing output control processing.

The following describes, with reference to the flowchart shown in FIG. 6, the output control processing for selectively outputting one of the main line video data outputted from the main decoder 4 and the resized video data outputted from the resize block 6.

First, in the output control processing, in step S41, the switch 7 determines whether the ready flag is set to "0" or "1". If the ready flag is found set to "1" in step S41, namely the main decoder 4 is outputting, as the ready flag, "1" indicative of the completion of the output preparation of the main line video data, then the procedure goes to step S42, in which the switch 7 determines whether a select signal outputted from the controller 11 is indicative of either the main line data or the low-resolution data.

To be more specific, receiving an operation signal indicative of the selection of the main line data or the low-resolution data after the operation performed by the user through the operator block, the controller 11 supplies, in accordance with the received operation signal, the select signal indicative of either the main line data or the low-resolution data to the switch 7. In step S42, the switch 7 determines whether the select signal supplied from the controller 11 is indicative of the main line data or the low-resolution data.

If the select signal received from the controller 11 is found to be indicative of the main line data in step S42, then the procedure goes to step S43, in which the switch 7 selectively outputs one of the main line video data outputted from the main decoder 4 and the resized video data outputted from the resize block 6, upon which the procedure returns to step S41.

If the select signal received from the controller 11 is found to be indicative of the low-resolution data in step S42, the procedure goes to step S44, in which the switch 7 selectively outputs one of the main line video data outputted from the main decoder 4 and the resized video data outputted from the resize block 6, upon which the procedure returns to step S41.

Therefore, if the ready flag is indicative that the main line video data is ready for outputting, the switch 7 outputs the main line video data or the resized video data in accordance with the operation performed by the user to a display device, not shown, via the OSD block 8 or the scan converter 9 for display on the display device.

On the other hand, if the ready flag is found to be "0" in step S41, namely the main decoder 4 outputs the ready flag set to "0" indicative that the main line video data is not ready for outputting, then the procedure goes to step S44, in which the switch 7 selectively outputs the resized video data as shown above, upon which the procedure returns to step S41.

Therefore, if the ready flag is indicative that the main line video data is not ready for outputting, the switch 7 supplies the resized video data to a display device, not shown, via the OSD block 8 and the scan converter 9 for display on the display device regardless of the user's operation.

If an uncorrectable error is encountered on the main line data as described with reference to FIG. 5, the ready flag is set to "0" indicative that the main line video data is not ready for outputting. Therefore, with the disk reproducing apparatus shown in FIG. 1, the switch 7 selectively outputs the resized video data, consequently executing error concealment.

To be more specific, if the main decoder 4 is an MPEG decoder and an error occurs on the main line data, making it impossible to decode the failing main line data, the main decoder 4, which is an MPEG decoder, continues outputting the frame which can be decoded last. Therefore, as described above, when a long GOP is employed, the main line video data outputted from the main decoder 4 keeps freezing for as long as 0.5 second in the worst case. As a result, when the output of the main decoder 4 is to be always displayed, a same screen is displayed for a long time, thereby making the user feel odd.

On the other hand, if an error occurs on the main line data in the disk reproducing apparatus shown in FIG. 1, making it impossible to decode the failing data, the switch 7 selectively outputs the resized video data, so that the user can view a moving picture in spite of its low-resolution picture quality.

As described above, according to the disk reproducing apparatus shown in FIG. 1, the main line data and the low-resolution data is outputted from the optical disk 1 and one of these data is selectively outputted depending on an error or no error on the main line data, thereby facilitating error concealment. To be more specific, in the disk reproducing apparatus in which the main line data and the low-resolution data is reproduced from the optical disk 1 and one of these data is selectively outputted, the selection of the main line data or the low-resolution data is executed only by determining whether there is an error on the main line data or not, so that error concealment may be executed without especially arranging such a circuit dedicated to error concealment as the above-mentioned interpolating circuit for example.

It should be noted that, as compared with the main line video data, the resized video data obtained by resizing the low-resolution data is of lower resolution. However, because the resized video data is uniform in picture quality unlike the error concealment obtained by interpolating a part of the main line video data, the resized video data is advantageous in picture quality in the sense that it does not make the user feel odd.

Figure 7:
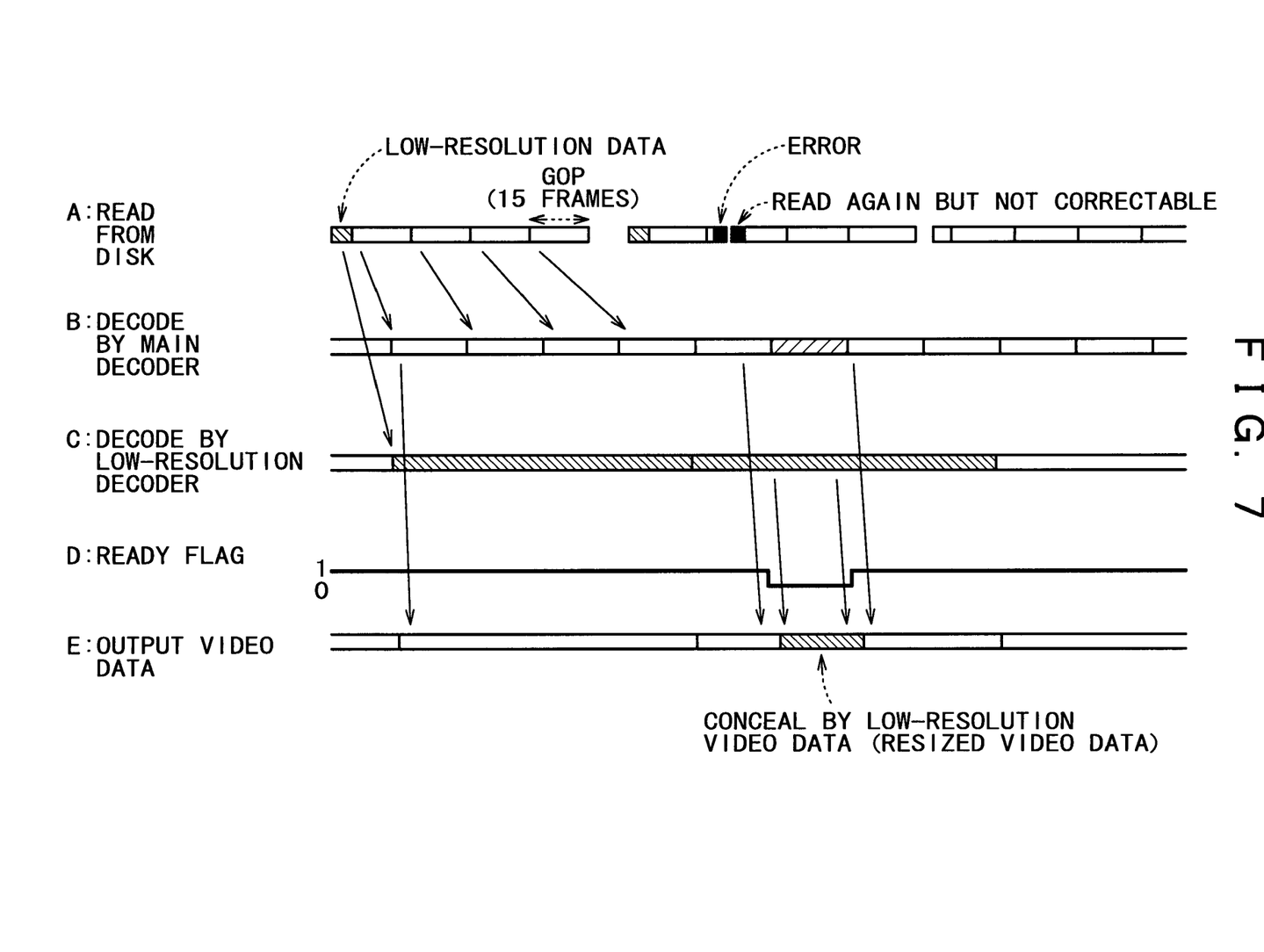
FIG. 7 is a diagram illustrating an example of error concealment.

The following further describes the error concealment to be executed in the disk reproducing apparatus shown in FIG. 1 with reference to FIG. 7.

As shown in A of FIG. 7, under the control of the drive control block 14, the disk drive 2 sequentially reads the low-resolution data and the main line data from the optical disk 1 on a carton basis.

Then, the main decoder 4 decodes the main line data read from the optical disk 1 into the main line data as shown in B and the low-resolution decoder 5 decodes the low-resolution data read from the optical disk 1 into the low-resolution video data as shown in C. It should be noted that the low-resolution video data obtained by the low-resolution decoder 5 is resized by the resize block 6 into resized data.

On the other hand, if the main line data can be decoded, the main decoder 4 outputs the ready flag "1" as shown in D; in this case, the switch 7 selectively outputs the main line video data obtained by the main decoder 4 as shown in E.

Next, if an error is encountered on the main line data read from the optical disk 1 as shown in A and it is impossible to decode the failing data as shown in B, the main decoder 4 sets the ready flag to "0" only for the period of the frame of the main line data which cannot be decoded as shown in D.

In this case, the switch 7 selectively outputs the resized video data (low-resolution video data) obtained by the low-resolution decoder 5 and the resize block 6 as shown in E, thereby executing the error concealment of the main line data.

Then, when the main line data is ready for decoding, as shown in B, the main decoder 4 starts decoding the main line data and sets the ready flag to "1" as shown in D. In this case, the switch 7 selectively outputs again the main line video data obtained by the main decoder 4 as shown in E.

Next, in the data reproducing apparatus shown in FIG. 1, the drive control block 14, configured by the file system and the device driver as described above, controls the reading of data from the optical disk 1 through the disk drive 2 in response to a requests from the low-resolution decoder control block 12 and the main decoder control block 13.

When requesting the reading of video data from the optical disk 1, the low-resolution decoder control block 12 and the main decoder control block 13 specify the file name and time code, for example, of the video data. The file system constituting the drive control block 14 computes, from the file name and the time code, the clusters of the optical disk 1 on which the requested data is stored and requests the device driver for reading the data.

The speed of access to the optical disk 1 is lower than the speed of access to a hard disk for example, which is a magnetic disk, and both the low-resolution decoder control block 12 and the main decoder control block 13 request the file system for the reading of video data, so that the data must be read from the optical disk 1 efficiently. Therefore, for example, the file system informs the device driver of the cluster from which the data is to read, by use of an algorithm to be described with reference to FIGS. 8A to 8C.

Figure 8A:
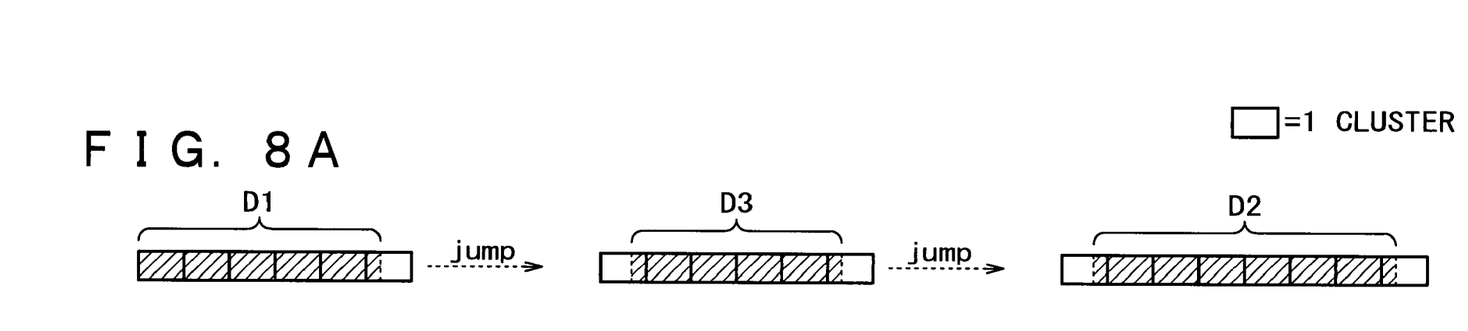
FIGS. 8A to 8C are diagrams illustrating a file system algorithm.
Figure 8B:
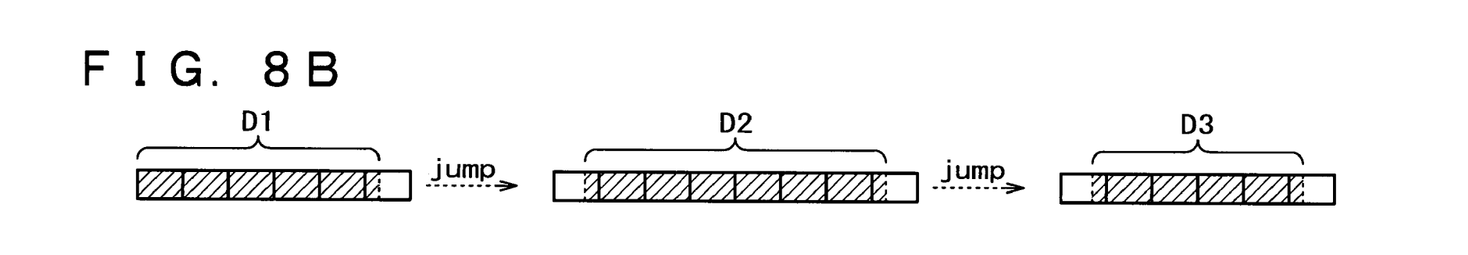
Figure 8C:
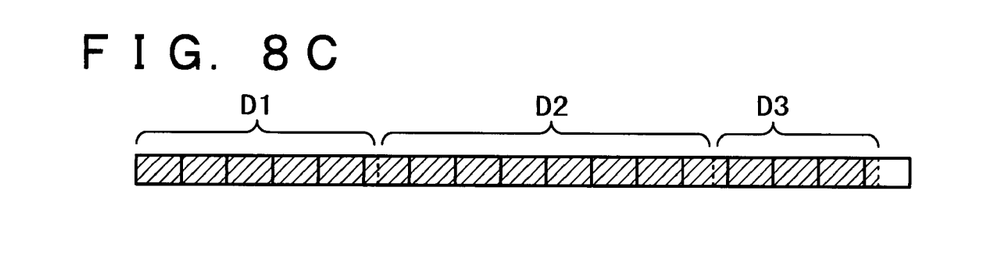

To be more specific, assume that data blocks D1, D2, and D3 be continuously recorded on the optical disk 1 in this order and there be a request to the file system to read the data blocks D1, D3, and D2 in this order from the optical disk 1.

In this case, if the file system informs the device driver the start cluster of the data blocks D1, D3, and D2 in the same order as that requested for reading, jump to this start cluster of the data block D1 takes place in the disk drive 2 to read the cluster and then jump to the start cluster of data block D3 takes place to read this cluster as shown in FIG. 8A. Further, jump to the start cluster of data block D2 takes place to read this cluster.

Therefore, in this case, although the data blocks D1, D2, and D3 are continuously recorded, jumps take place in the disk drive 2 before reading the data blocks D1, D3, and D2, thereby restricting the efficiency of data reading.

It should be noted that, in FIGS. 8A to 8C, one rectangle is indicative of a cluster and each hatched portion denotes a data recorded block (or a data block).

In order to enhance the efficiency of data reading in the file system, the order of the data blocks D1, D3, and D2 may be sorted into their recording order D1, D2, and D3 and the information about the start cluster of each data block may be transmitted to the device driver.

In this case, however, as shown in 8B, jump is made to the start cluster of the data block D1 in the disk drive 2 to read this cluster and then to the start cluster of the data block D2 to read this cluster. Further, jump is made to the start cluster of the data block D3 to read this cluster in the disk drive 2.

Consequently, in this case also, jumps are made in the disk drive 2 before reading the data blocks D1, D2, and D3, so that, as compared with the reading of the data blocks D1, D3, and D2 in this order, the efficiency of data reading does not improve so much.

In order to significantly enhance the efficiency of data reading, the file system transmits the information about the start clusters of the data blocks D1, D2, and D3 continuously recorded on the optical disk 1 to the device driver as shown in FIG. 8C. Consequently, the data blocks D1, D2, and D3 are continuously read in the disk drive 2. In this case, in the disk drive 2, jump is made only once to the start cluster of the data block D1 to read the data blocks D1, D2, and D3, thereby significantly enhancing the efficiency of data reading.

It should be noted that, in the above-mentioned case, it is necessary in the file system to recognize the clusters of the optical disk 1 on which the data blocks requested for reading are recorded and then check whether or not there is an overlap between these clusters and the clusters of the data blocks in the wait state due to looping, thereby recognizing whether or not a plurality of clusters are recorded in continuous clusters.

The above-mentioned sequence of processing operations may be executed by hardware as well as software. In the approach by software, the programs constituting the software are installed in a general-purpose computer (including a so-called microprocessor and a DSP for example).

Figure 9:
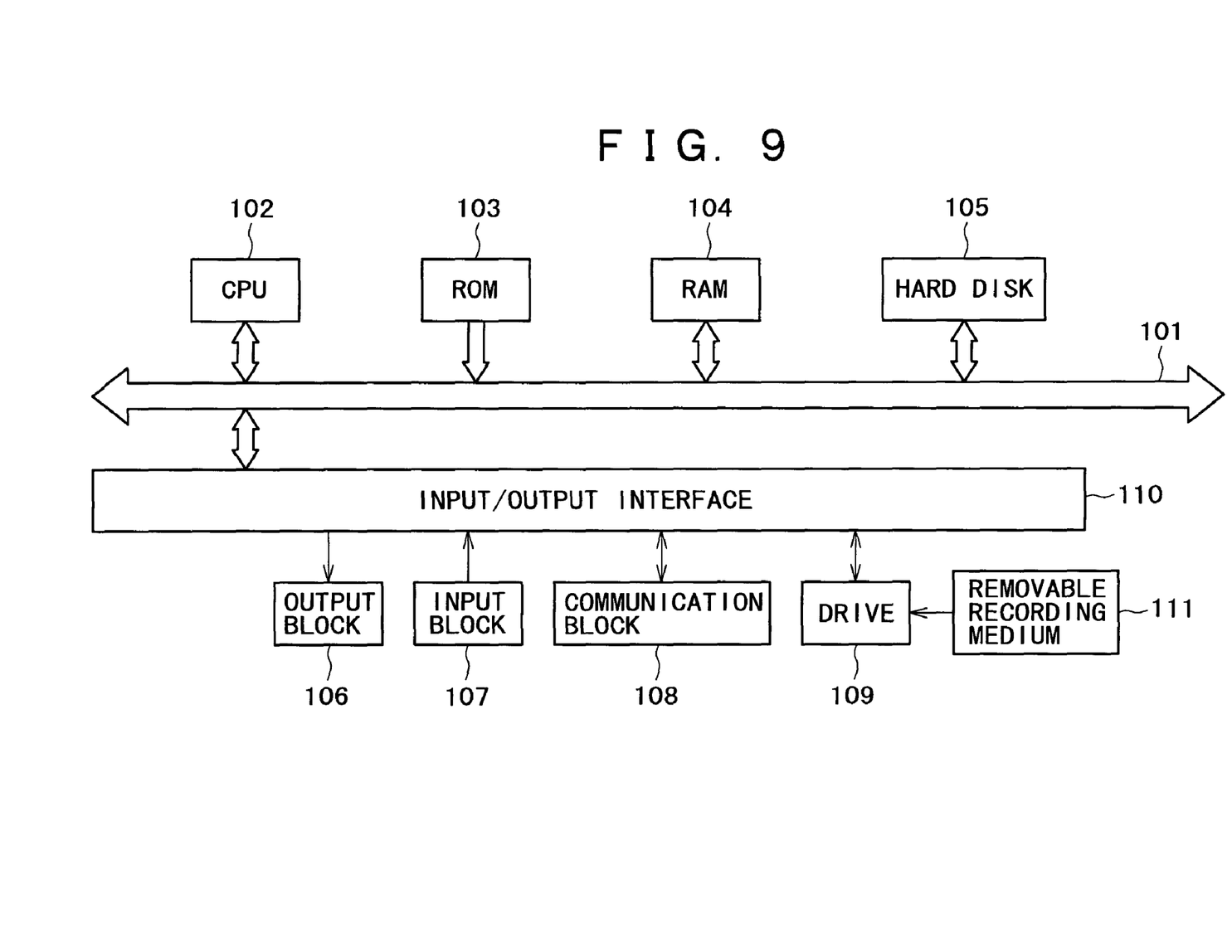
FIG. 9 is a block diagram illustrating an exemplary configuration of a computer practiced as one embodiment of the invention.

Referring to FIG. 9, there is shown an exemplary configuration of one embodiment of a computer in which the programs for executing the above-mentioned sequence of processing operations are installed.

These programs may be recorded beforehand to a hard disk 105 and a ROM 103, which are the recording media incorporated in the computer.

Alternatively, these programs may be temporarily or permanently stored (or recorded) in a removable recording medium 111 such as flexible disk, CD-ROM (Compact Disc Read Only Memory), MO (Magneto Optical) disk, DVD (Digital Versatile Disc), a magnetic disk, and a semiconductor memory. These removal recording medium 111 may be provided as a so-called package software product.

It should be noted that these programs may be installed from not only the above-mentioned removable recording medium 111 but also from so-called download sites to the computer via a digital broadcasting satellite in a wireless manner or via networks such as a LAN (Local Area Network) and the Internet in a wired manner. The computer receives, at its communication block 108, these programs supplied in the above-mentioned manners and installs the received programs in the hard disk 105.

The computer has a CPU (Central Processing Unit) 102. The CPU 102 is connected to an input/output interface 110 via a bus 101. When commands are issued by the user by operating an input block 107 configured by a keyboard, a mouse, and a microphone for example, the CPU 102 accordingly executes the corresponding programs stored in a ROM (Read Only Memory) 103. Alternatively, the CPU 102 executes the programs stored in the hard disk 105, the programs received at the communication block 108 from an artificial satellite or a network and installed in the hard disk 105, or the programs read from the removable recording medium 111 loaded on a drive 109 and installed in the hard disk 105 by loading them into a RAM (Random Access Memory) 104. Then, the CPU 102 outputs the processing results from an output block 106 configured by an LCD (Liquid Crystal Display) and a speaker for example, transmits the processing results from the communication block 108, or records the processing results to the hard disk 105, via the input/output interface 110.

It should be noted that, herein, the processing steps describing programs for making the computer execute various processing operations need not be executed in a time-series manner in the order described in the above-mentioned flowcharts; namely, these processing steps include the processing operations which are executed in parallel or discretely (for example, parallel processing and object processing).

The above-mentioned programs may be executed by either a single computer or a plurality of computers in a distributed manner. Further, these programs may be transferred to a remote computer for execution.

In the present embodiment, the error concealment of video data is executed. The present invention is also applicable to the error concealment of audio data.

In the present embodiment, the data obtained by lowering the resolution of the main line data is used as the low-resolution data. It will be apparent that the data obtained by lowering the bit allocation to the pixels constituting the main line data may be employed, for example.

In the present embodiment, the data obtained by JPEG-encoding video data is used as the low-resolution data, for example. It will be apparent that the encoding for obtaining the low-resolution data is not necessary limited to the JPEG encoding. Further, the low-resolution data may be obtained by simply discretely reducing the main line data. In this case, the simple discrete reduction processing may be regarded as a kind of encoding.

In the disk reproducing apparatus shown in FIG. 1, the main decoder 4, the low-resolution decoder 5, the resize block 6, and the switch 7 may be arranged in a duplicate manner so as to switch between the two systems if one of them fails.

As described and according to the invention, the error concealment of data may be significantly facilitated.

While the preferred embodiments of the present invention have been described using specific terms, such description is for illustrative purposes only, and it is to be understood that changes and variations may be made without departing from the spirit or scope of the appended claims.

What is claimed is:

1. A data processing apparatus comprising:
   error detection means for detecting first data for an error, said first data being read from a data recording medium storing said first data and second data corresponding to said first data and having a data amount smaller than that of said first data;
   error concealment means for concealing an error if any found on said first data by use of said second data read from said data recording medium;
   first control means for controlling the reproduction of said first data;
   second control means for controlling the reproduction of said second data,
      wherein said first control means controls the reproduction of said first data in response to the reproduction of said second data controlled by said second control means,
      wherein, if no error is found on said first data, said error concealment means selectively outputs said first data and, if an error is found on said first data, selectively outputs said second data, and
      wherein said first data is video data and said second data is video data obtained by lowering the resolution of video data as said first data;
   first decoder means for decoding encoded first video data having high-resolution;
   second decoder means for decoding encoded second video data having low-resolution; and output means for outputting said first data having high-resolution on the condition that real-time reproduction would not be interrupted during a state where sufficient reread time exists.

2. The data processing apparatus according to claim 1, further comprising:
   resize means for resizing said video data as said second data into the same size of said video data as said first data.

3. The data processing apparatus according to claim 1, further comprising:
   read means for reading said first data or said second data from said data recording medium.

4. A data processing method comprising the steps of:
   detecting first data for an error, said first data being read from a data recording medium storing said first data and second data corresponding to said first data and having a data amount smaller than that of said first data;
   concealing an error if any found on said first data by use of said second data read from said data recording medium;
   controlling the reproduction of said first data;
   controlling the reproduction of said second data,
      wherein said first control step controls the reproduction of said first data in response to the reproduction of said second data controlled by said second control step,
      wherein, if no error is found on said first data, said error concealment step selectively outputs said first data and, if an error is found on said first data, selectively outputs said second data, and
      wherein said first data is video data and said second data is video data obtained by lowering the resolution of video data as said first data;
   decoding encoded first video data having high-resolution;
   decoding encoded second video data having low-resolution; and
   outputting said first data having high-resolution on the condition that real-time reproduction would not be interrupted during a state where sufficient reread time exists.

5. The data processing method according to claim 4, further comprising the step of:
   resizing said video data as said second data into the same size of said video data as said first data.

6. The data processing method according to claim 4, further comprising the step of:
   reading said first data or said second data from said data recording medium.

7. A program recorded on a computer readable medium for making a computer execute a data processing method, said program comprising the steps of:
   detecting first data for an error, said first data being read from a data recording medium storing said first data and second data corresponding to said first data and having a data amount smaller than that of said first data;
   concealing an error if any found on said first data by use of said second data read from said data recording medium;
   controlling the reproduction of said first data;
   controlling the reproduction of said second data,
      wherein said first control step controls the reproduction of said first data in response to the reproduction of said second data controlled by said second control step,
      wherein, if no error is found on said first data, said error concealment step selectively outputs said first data and, if an error is found on said first data, selectively outputs said second data,
      wherein said first data is video data and said second data is video data obtained by lowering the resolution of video data as said first data;
   decoding encoded first video data having high-resolution;

decoding encoded second video data having low-resolution;

outputting said first data having high-resolution on the condition that real-time reproduction would not be interrupted during a state where sufficient reread time exists.

8. The program according to claim 7, further comprising the step of:

resizing said video data as said second data into the same size of said video data as said first data.

9. The program according to claim 7, further comprising the step of:

reading said first data or said second data from said data recording medium.

* * * * *